US010480991B2

(12) United States Patent
Calleri

(10) Patent No.: US 10,480,991 B2
(45) Date of Patent: Nov. 19, 2019

(54) DEVICE FOR THE QUANTITATIVE ANALYSIS OF DEBRIS PRODUCED WHILE DRILLING A WELL

(71) Applicant: Geolog Americas Inc., Houston, TX (US)

(72) Inventor: Antonio Calleri, Houston, TX (US)

(73) Assignee: Geolog Americans Inc., Houston, TX (US)

( * ) Notice: Subject to any disclaimer, the term of this patent is extended or adjusted under 35 U.S.C. 154(b) by 193 days.

(21) Appl. No.: 15/666,336

(22) Filed: Aug. 1, 2017

(65) Prior Publication Data

US 2019/0041255 A1 Feb. 7, 2019

(51) Int. Cl.

*G01G 21/22* (2006.01)
*E21B 7/04* (2006.01)
*E21B 21/01* (2006.01)
*E21B 21/06* (2006.01)

(52) U.S. Cl.

CPC ............. *G01G 21/22* (2013.01); *E21B 21/01* (2013.01); *E21B 21/065* (2013.01); *E21B 7/04* (2013.01)

(58) Field of Classification Search

CPC ....... G01G 21/22; E21B 21/01; E21B 21/065; E21B 7/04
USPC .......................................................... 177/145
See application file for complete search history.

(56) References Cited

U.S. PATENT DOCUMENTS 3,155,183 A * 11/1964 Bradford .................. B65B 1/32 177/162
3,567,072 A * 3/1971 Tenhulzen ............. A01F 12/00 177/112
5,129,468 A 7/1992 Parmenter
6,410,862 B1 6/2002 Lecann
6,693,244 B2 * 2/2004 Johnson ............... G01G 11/003 177/126
2008/0250853 A1 10/2008 Calleri
2011/0266065 A1 11/2011 Calleri

* cited by examiner

*Primary Examiner* — Randy W Gibson
(74) *Attorney, Agent, or Firm* — Workman Nydegger

(57) ABSTRACT

A device includes: a frame; a tray supported by the frame; a measurement device configured to weigh debris loaded on the tray; wherein the tray has a front end and a rear end with a first side and a second side each extending therebetween; wherein the first side has a first protrusion and a second protrusion with a movement member being configured to make the first protrusion follow a first trajectory; a guide is configured to make the second protrusion follow a second trajectory while the first protrusion is moved along said first trajectory; wherein the movement member is configured to act on said first protrusion so as to roto-translate the tray between a first position, wherein the tray is configured to carry debris to be weighted, and a second position wherein the tray is configured to discharge the debris.

10 Claims, 6 Drawing Sheets

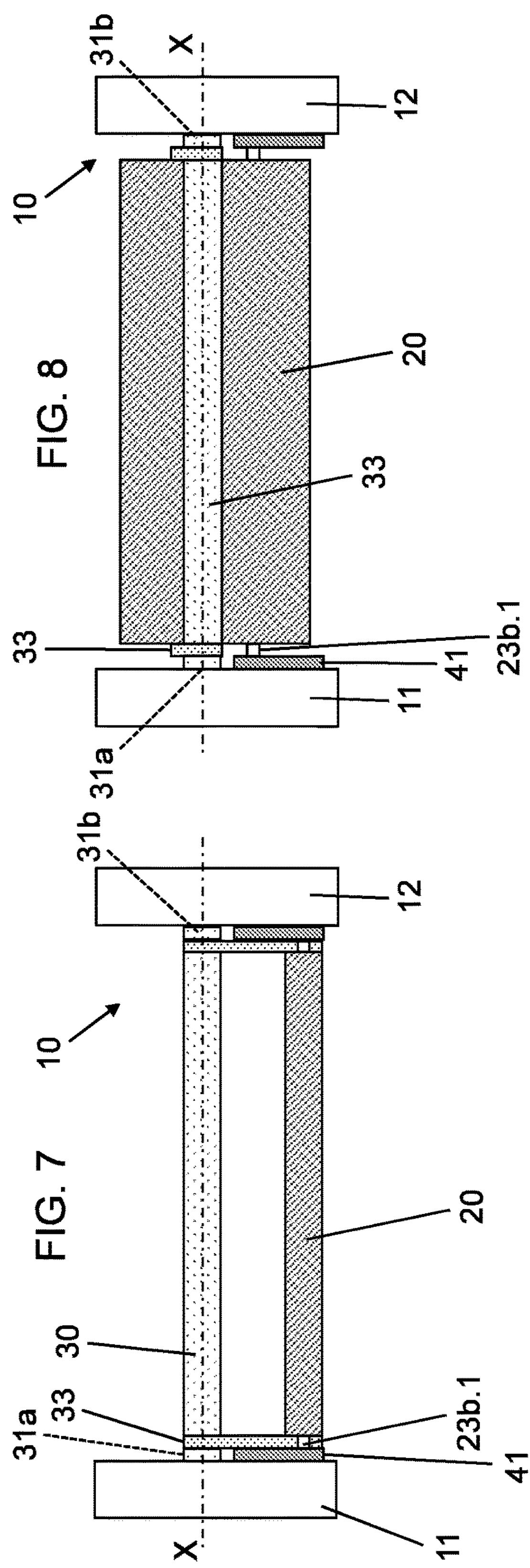
FIG. 8
FIG. 7
10
12
11
20
33
30
31a
31b
41
23b.1
X
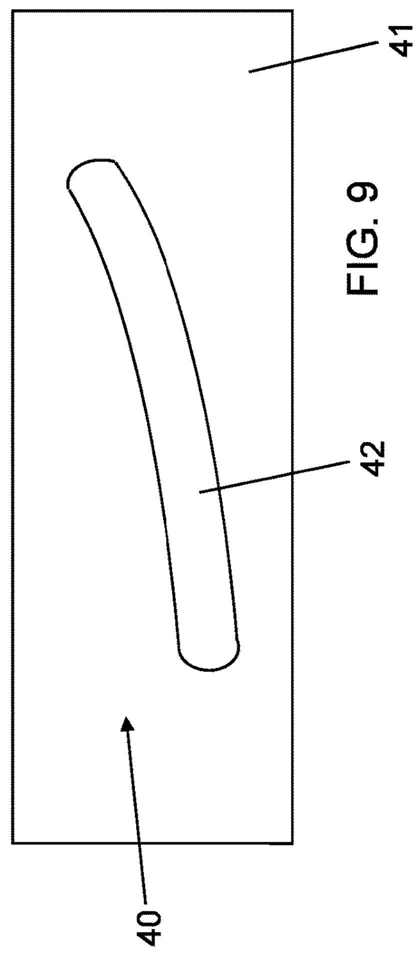
FIG. 9
41
42
40

DEVICE FOR THE QUANTITATIVE ANALYSIS OF DEBRIS PRODUCED WHILE DRILLING A WELL

CROSS-REFERENCE TO RELATED APPLICATIONS

Not applicable.

BACKGROUND OF THE INVENTION

1. The Field of the Invention

The present invention relates to a device for the quantitative analysis of debris produced while drilling a well. Said device is preferably of the stand-alone type, i.e., able to function in an independent manner from other devices such as a data acquisition unit.

2. The Relevant Technology

The drilling of soil is commonly performed with a rotary system, i.e., using a rotating drill bit screwed to the end of a progressive series of drill rods. A technique is also known that allows wells to be formed in a way that follows a "deviated trajectory", i.e., a trajectory that is not perpendicular to the drilled surface. Said wells develop in excess of 35,000 feet in depth in an almost horizontal manner through the progressive curving of the rods.

When the drilling reaches such depths, the drill bits are subjected to torsional torques far greater than those following a vertical trajectory. In these cases, a real time adjustment of the drilling parameters (e.g., the speed of rotation and rate of penetration of the drilling bit, the dynamic of circulation of the fluids and their rheological properties, etc.) is very important. In particular, the geometry of the well and the behaviour of the rock walls that define the internal surface of the well are to be check very carefully.

In order to contrast the thrust force of the formations encountered during drilling and pressure of the fluids contained therein, a drilling fluid fills and it is circulated in the well. Said fluid also serves to transport debris produced during drilling outside of the well. Debris has to be removed since an accumulation of debris in the gap between the bit and the walls of the well would cause an increase in the resistance torque, creating a risk of blockage and bit failure.

The variation in volume of the well during drilling can be expressed by the following relation:

$$\frac{dV(t)}{dt} = \vec{S}(\vec{x}, t) \cdot d\vec{x}(t)dt + Q(\vec{x}, t + \tau_1) = v(t + \tau_2)$$

where V(t) represents the volume of the well in the instant t, S the area of the section of the well at the instant t and the depth x and Q is a source term.

Thus the variation of the volume of the well in the unit of time (dV(t)/dt) is equal to the sum of a source term Q and of the product of the area S of the section of the well at the same depth and at the same instant and the advancement dx dt of the bit in the infinitesimal interval of time dt.

At the mouth of the well, it is possible to measure the volume v of the debris transported by the drilling fluid, with a certain delay $\tau 2$ in relation to the instant t. This delay is due to the speed of circulation of the fluid which has to transport the debris as far as the mouth of the well and to its rheological properties.

The source term Q is equal to the difference between the variation in the volume of the well and the volume of the debris transported by the drilling fluid; said source term Q being able to supply fundamental information for monitoring the drilling. In fact, when Q is negative, it means that a dangerous accumulation of debris in the well is probably occurring and there is a risk of bit failure. If, instead, Q is positive, the amount of debris collected at surface is larger than expected, hence probably a formation collapse occurred in the well and therefore, at least in same portion of the well, the walls are unstable.

This type of monitoring or quantitative analysis of debris is particularly important in deviated drilling because wells can be very long and the problems of stability and cleanliness of the hole are accentuated.

The quantitative analysis of the debris, i.e., measurement of the weight of the debris and therefore of its volume, is carried out by means of specific machinery located at the well mouth. When the drilling fluid which carries the debris reaches the surface, said fluid traverses special vibrating screens (so called "shale shakers") which separate the solid debris from the liquid. The debris is then conveyed onto apparatuses for weighing.

Document EP 0 995 009 A1 discloses a device comprising means for collecting the debris and means for measuring their weight in a continuous manner. Said means for collecting debris comprise a tray rotating around an axis, means for tilting said tray so as to empty it and means of driving said means for tilting the tray. Connected to said means for tilting the tray is a measuring cell able to measure the bending moment of the tray in relation to its axis of rotation, being then possible to calculate the weight of the debris based on the value measured from said bending moment.

The measured weight of the debris based on the bending moment, as occurs in the device described in EP 0 995 009 A1, is, however, imprecise due to the uncertainty of the location of the center of mass of the debris distributed on the tray in relation to the axis of rotation of the same.

In EP 0 995 009 A1, the surface of the tray must have a width equal at least to standard vibrating screens and a certain volume is required for the tray to perform its rotation; accordingly, the dimensions of the entire structure of the device are necessarily considerable. Consequently, in many operating situations in which there is a real lack of space, it is not possible to use an apparatus such as that disclosed in EP 0 995 009 A1.

Italian Patent No. 1,366,349 in the name of Geolog S.p.A. discloses a device for the quantitative analysis of debris provided with means for collecting debris comprising a conveyor belt wound in a manner of a track on at least two rollers and means for measuring the weight of the debris comprising at least four extensometric cells.

Said extensometric cells are preferably arranged at the four corners of a base upon which the support structure of the device is placed in order to perform a direct measurement of the weight force exerted on the conveyor belt.

Accordingly, some of the drawbacks of the device disclosed in EP 0 995 009 A1 are overcome because the systematic imprecision, due to the uncertainty of the location of the center of mass of debris distributed on the tray in relation to the axis of rotation, is eliminated.

However, the Applicant has noted that some improvements connected to the considerable bulk and, therefore, lack of flexibility of use could still be achieved.

The Applicant has also noted that devices for the quantitative analysis of debris present in the art could not be used in stand-alone arrangements, i.e., independently from other services.

BRIEF SUMMARY OF THE INVENTION

An object of the present invention is to provide a device for the quantitative analysis of debris produced in the drilling of a well, which is capable of operating under restrictive conditions as in the case of the latest generations of drilling oilrigs, which are characterised by extremely reduced and complex geometries and distribution of space, e.g., offshore drilling platforms.

Another object of the present invention is to provide a device for the quantitative analysis of debris produced in the drilling of a well which can be installed in a manner totally independent from other services, i.e., in a so called "stand-alone arrangement".

These and other objects are achieved by a device for the quantitative analysis of debris according to the claims appended hereto.

BRIEF DESCRIPTION OF THE DRAWINGS

Further features and advantages will become apparent in view of the description of preferred embodiments on the invention provided in the following, in connection with the attached drawings. It has to be noted that both the detailed description and the drawings show non-limiting examples of the present invention and are not intended to have any limiting purpose.

FIG. 7 and FIG. 8 schematically represent front views of the device of FIG. 3, in said different conditions;

FIG. 9 shows a schematic front view of another component of the device of FIG. 3.

DETAILED DESCRIPTION OF THE PREFERRED EMBODIMENTS

Figure 10:
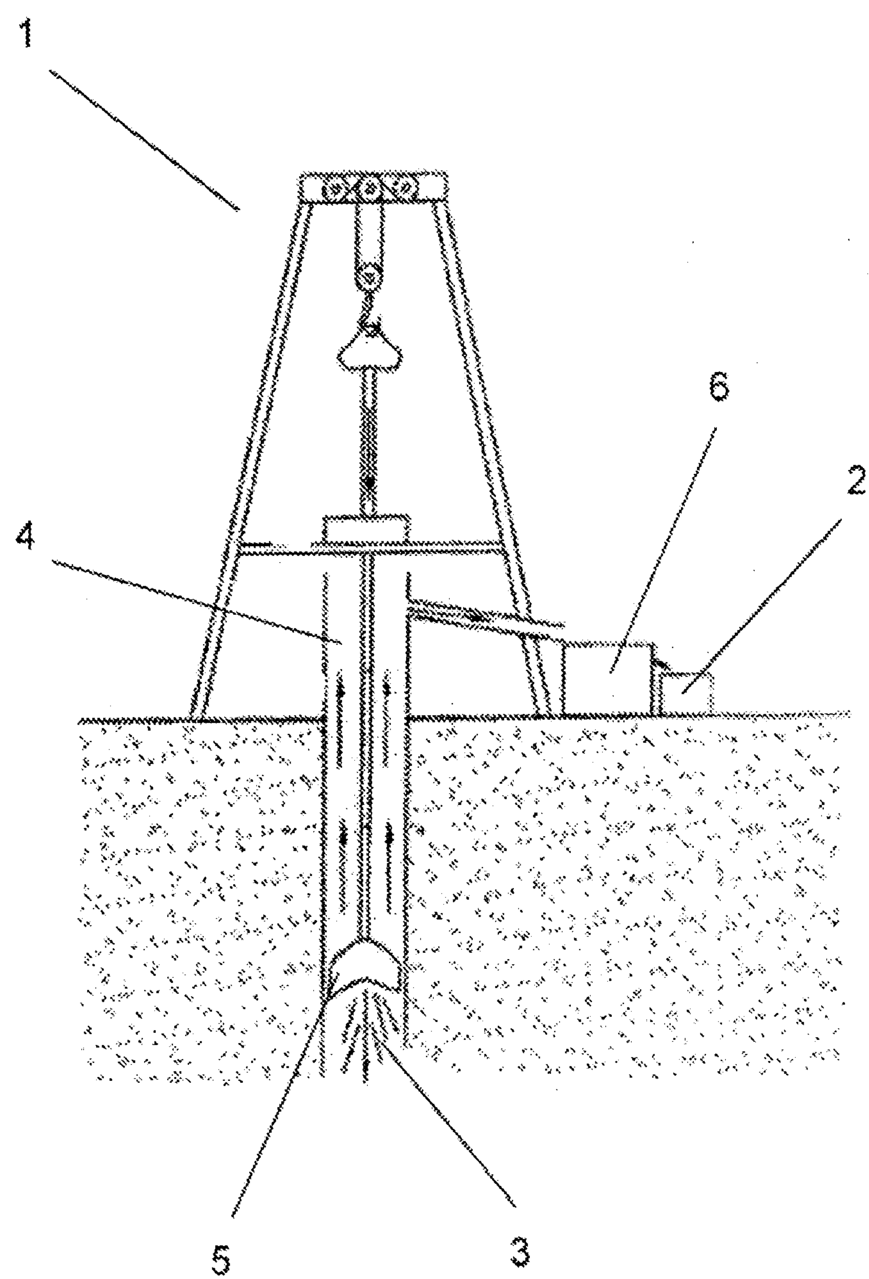
FIG. 10 schematically shows a drilling plant wherein the invention can be implemented.

FIG. 10 shows schematically a drilling plant 1, wherein a device 2 for the quantitative analysis of the debris according to the present invention can be employed. The drilling fluid 3 follows the following path (indicated in the drawing with arrows): the drilling fluid 3 flows in the hollow interior of the drilling column 4, and exits from the tool 5. The drilling fluid 3 brings in suspension the debris of the rock as far as the surface, after having risen up in the annular space existing between the drilling column 4 and the walls of the well. Having reached the surface, the drilling fluid 3 traverses the vibrating screens 6, consisting in general of a series of vibrating sieves aimed at separating the drilling fluid from the solid debris. The debris is collected at a discharge side of the vibrating screens 6 by the device 2 for quantitative analysis according to the present invention.

The device 2 comprises a frame 10. Preferably the frame 10 comprises at least a first upright 11 and a second upright 12. As it will be disclosed in the following, the space between the first upright 11 and the second upright 12 is the operative space of the device 2.

The device 2 further comprises a tray 20 that is supported by the frame 10.

Preferably, the tray 20 is arranged between the first upright 11 and the second upright 12. In particular, the tray 20 extends substantially from the first upright 11 to the second upright 12.

The tray 20 has a front end 21 and a rear end 22. The tray 20 has a first side 23 and a second side 24 each extending from the front end 21 to the rear end 22.

Figure 4:
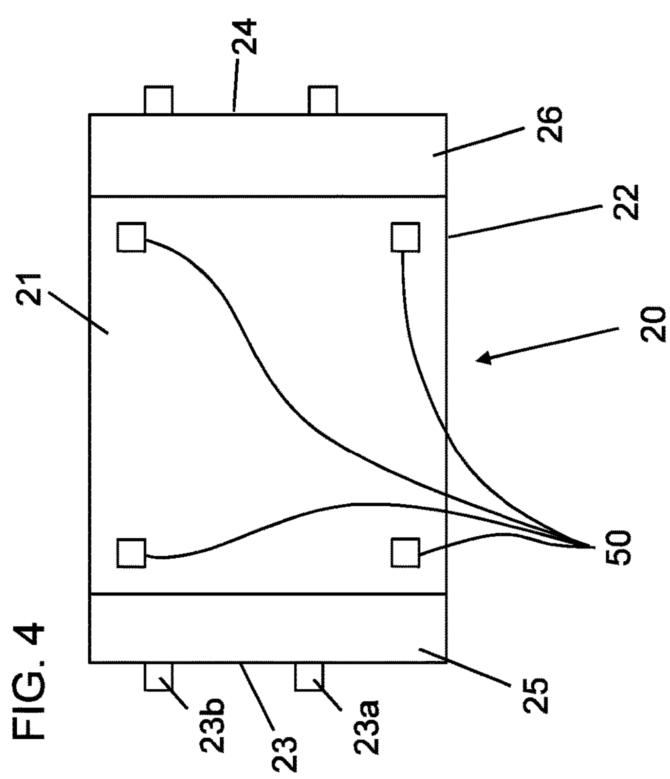
FIG. 4 shows a schematic plan view of a component of the device of FIG. 3.

In practice, in a plant view (see FIG. 4, for example), the tray 20 has preferably a substantially rectangular shape, wherein the front end 21 and the rear end 22 define a couple of opposite sides of said rectangular shape, and the first side 23 and the second side 24 are another couple of opposite sides of said rectangular shape. For example, the front end 21 and the rear end 22 define the longer sides of the rectangular shape, and the first and second sides 23, 24 define the shorter sides of the rectangular shape.

Preferably, the tray 20 is provided with two lateral fins 25, 26 (schematically shown in FIG. 4) configured to prevent lateral leakage of debris.

Preferably, the tray 20 is dimensioned in such a way that its width (i.e., the length of its longer sides) is substantially equal to the transverse dimensions of the discharge channel of the vibrating screens, from which the flow of debris continuously exits. Preferably the length of the tray 20 (i.e., the length of the first and second sides 23, 24 for example) allows for the accumulation of a quantity of debris sufficient for obtaining weight measurements that can be interpreted. The tray 20 is preferably made with stainless steel, which does not deteriorate as a result of chemical attack produced by substances dissolved in residual drilling fluid and by the abrasive action of the debris itself.

Preferably, the tray 20 has rear discharge ports (intermittent millings) which allows liquid to seep out of the slurry, retaining the solid.

Advantageously, the first side 23 of the tray 20 is provided with a first protrusion **23*a* and a second protrusion 23*b***.

Preferably, the first protrusion **23*a* is arranged in a central portion 23*c* of the first side 23**.

Preferably, the second protrusion **23*b* is arranged between the first protrusion 23*a* and the front end 21 of the tray 20**.

Preferably, the first and second protrusions **23*a*, 23*b* extend from the first side along a substantially horizontal direction, i.e., a direction substantially parallel to a planar extension of the tray 20**.

In one embodiment, the second protrusion **23*b* comprises a plug 23*b*.1 and a wheel 23*b*.2. The wheel 23*b*.2 is rotatably mounted on the plug 23*b*.1**.

In accordance with the invention, the device 2 further comprises a movement member 30 configured to make the first protrusion **23*a* follow a first trajectory T1**.

Preferably, the first trajectory T1 is defined by at least a portion of a circle.

Preferably, the movement member 30 comprises a shaft 31, rotatably mounted on said frame 10.

Preferably, the shaft 31 extends from the first upright 11 to the second upright 12. In particular, the shaft 31 has a first end 31*a* rotatably mounted to the first upright 11, and a second end 31*b* rotatably mounted to the second upright 12.

Preferably, the movement member further comprises an actuator 32, which is configured act on the shaft 31 and to rotate the shaft 31 around its longitudinal axis X.

In an embodiment, the actuator 32 can be realized as a compressed air actuator 32*a*, which pushes or pulls a connecting rod 32*b* via a spherical joint 32*c*, according to whether it is loaded or unloaded. The connecting rod 32*b* as a first end engaged with the spherical joint 32*c*, and a second end engaged with the shaft 31.

For example, the actuator 32 can be at least partly housed in one of the first and second uprights 11, 12.

Preferably, the movement member 30 comprises an arm 33, having a first end 33*a* mounted on the shaft 31 and a second end 33*b* engaged to the first protrusion 23*a* so that the second end 33*b* is hinged to the tray 20. For example, the second end 33*b* of the arm 33 can have an eyelet in which the first protrusion 23*a* is inserted.

Preferably, the first trajectory T1 is defined by a trajectory followed by the second end 33*b* of said arm 33 when the shaft 31 is rotated.

Preferably, the device 2 further comprises a guide 40 (FIGS. 3, 9) configured to make the second protrusion 23*b* follow a second trajectory T2 while the first protrusion 23*a* is moved along the first trajectory T1.

Preferably, the second trajectory T2 is curved with concavity facing upwards.

In an embodiment, the device 2 includes a plate 41 having a slot 42 defining said second trajectory T2.

The second protrusion 23*b* is engaged in the slot 42, so as to follow the second trajectory. As said, the second protrusion 23*b* can comprise a plug 23*b*.1 and a wheel 23*b*.2 rotatably mounted on said plug 23*b*.1; in this case, the wheel 23*b*.3 is engaged with the guide 40, and in particular with the slot 42, so as to follow the second trajectory T2.

According to the invention, the movement member 30 is configured to act on the first protrusion 23*a* so as to roto-translate the tray 20 between a first position and a second position.

In the first position, the tray 20 is configured to carry debris to be weighted. Preferably, in the first position, the tray 20 is substantially horizontal. Preferably, in the first position, the tray 20 is slightly tilted with the front end 21 at a greater height than the rear end 22.

Figure 2:
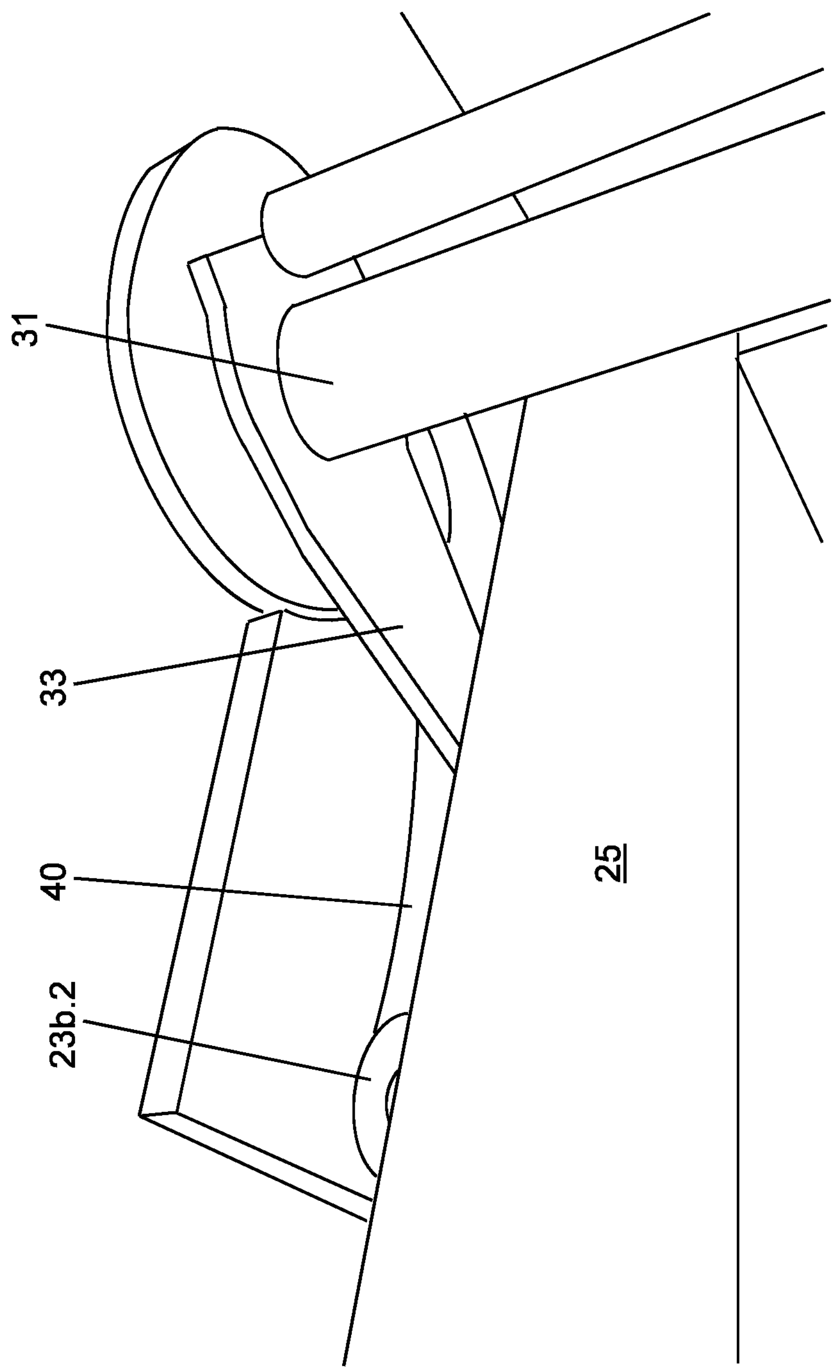
FIG. 2 shows a schematic perspective view of the device of FIG. 1, in a second condition, wherein some parts have been omitted in order to better illustrate other parts.
Figure 3:
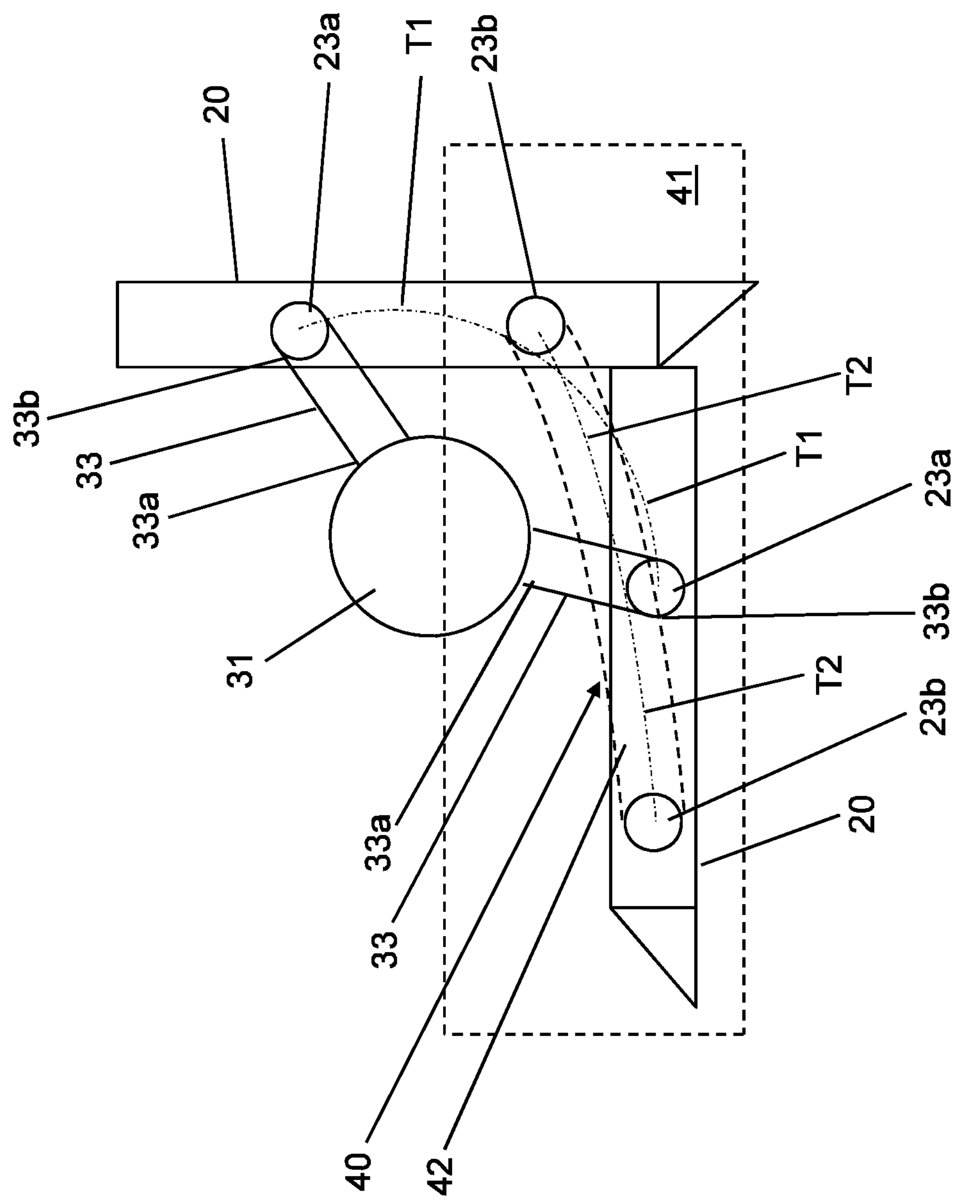
FIG. 3 shows a schematic side view of a device according to the invention, wherein two different conditions are illustrated.
Figure 5:
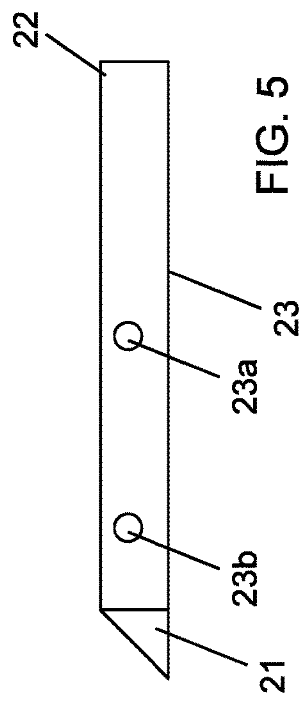
FIG. 5 shows a schematic side view of the component of FIG. 4.
Figure 6:
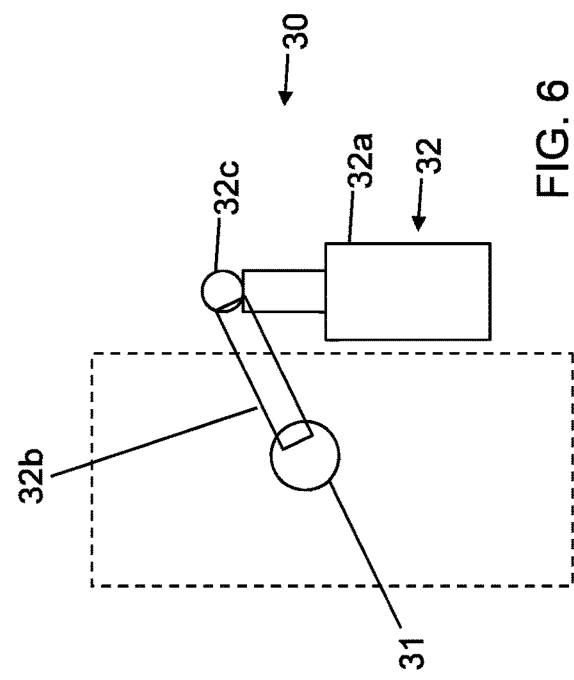
FIG. 6 schematically shows another component of a device according to the invention.

The first position is schematically shown in FIGS. 2, 3 and 7.

In the second position, the tray 20 is configured to discharge the debris. Preferably, in the second position, the front end 21 of the tray 20 is at a smaller height than the rear end 22, so that debris can leave the tray 20 by gravity.

Figure 1:
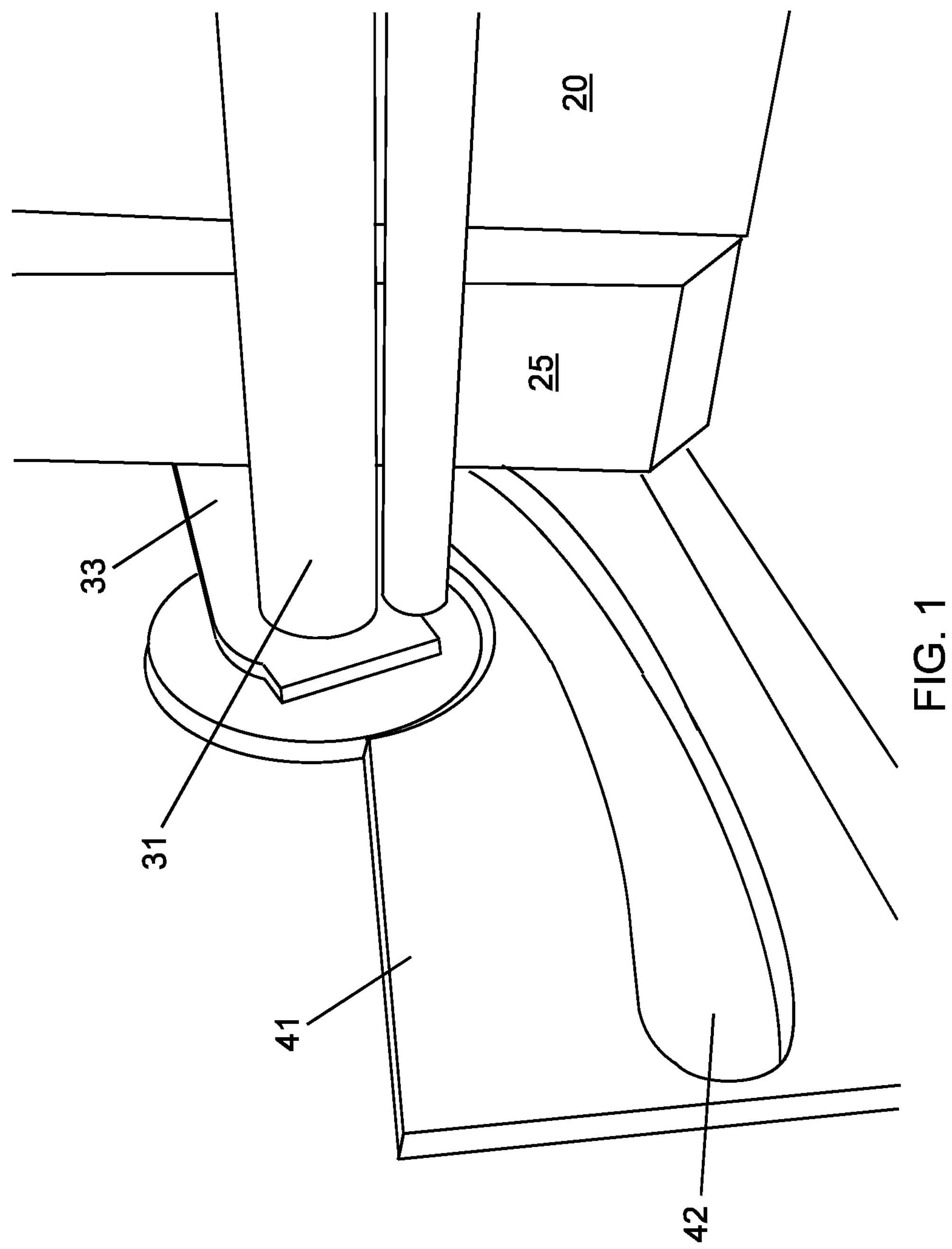
FIG. 1 shows a schematic perspective view of a device according to the invention, in a first condition, wherein some parts have been omitted in order to better illustrate other parts.

The second position is schematically shown in FIGS. 1, 3 and 8.

So far, the structure related to the first side 23 of the tray 20 has been disclosed. It has to be noted that the second side 24 can have the same structure and the same connection to the shaft 30. The device 2 can also be provided with an auxiliary guide, preferably formed as a slot in a plate-like element, in which a protrusion extending from the second side and having the same features of the aforementioned second protrusion 23*b* is engaged.

Conveniently, the device 2 further comprises a measurement device 50 configured to weigh debris loaded on the tray 20.

The measurement device 50 can comprise one or more load cells associated with the tray 20. For example, the measurement device 50 can comprise four load cells, each mounted at a respective corner of the tray 20.

In an embodiment, the tray 20 is connected to the load cells by means of vibration dampers, whose function is to insulate against external vibrations and compensate possible thermal expansions.

Preferably, the measurement device 50 is configured to incrementally measure the weight of the debris or of the ratio between the variation of the weight and the interval of time in which said variation is measured. The increment of time of collection or the maximum value of the increment of the weight can be pre-selected by the user on a case-by-case basis. Once the solid phase has been separated from the liquid phase of the material which has exited the mouth of the well, the vibrating screens discharge said solid phase (i.e., the debris) directly onto the tray 20.

As said, during the phase of collection, the tray 20 is still in a substantially horizontal position, with a slight tilt upwards. The four load cells generate a voltage signal correlated to the weight of the debris, which is progressively collected. Once this weight reaches the maximum limit set, or a preset interval of time set has passed by, the unloading operation is performed. In this operation, the actuator 32 is activated automatically and rotates the shaft 31 which, in turn, generates the roto-translation of the tray 20. The tray is now in a substantially vertical position, and the debris are discharged.

The tray 20 is then driven back to the substantially horizontal position, so as to be ready to receive further debris.

In other words, the tray 20 is continuously moved between the first position and the second position, so as to continuously perform loading operations alternated with debris discharge operation.

It has to be noted that the operative parameters of the device 2 are preferably selected by a user via a remote workstation, which also receives the signal coming from the measurement device 50. The workstation is provided with dedicated software for the acquisition, processing and storage in memory of the signals coming from the device 2. The software also allows for the visualization of the cumulative volume of debris as a function of time, the cumulative volume of debris as a function of depth and the theoretical profile of the well excavated.

What is claimed is:

1. A device comprising:

a frame;

a tray supported by said frame;

a measurement device configured to weigh debris loaded on said tray;

wherein the tray has a front end and a rear end;

wherein the tray has a first side and a second side each extending from said front end to said rear end;

wherein said first side has a first protrusion and a second protrusion;

the device further comprising a movement member configured to make the first protrusion follow a first trajectory;

the device further comprising a guide configured to make the second protrusion follow a second trajectory while the first protrusion is moved along said first trajectory;

wherein said movement member is configured to act on said first protrusion so as to roto-translate said tray between a first position, wherein the tray is configured to carry debris to be weighted, and a second position wherein said tray is configured to discharge said debris, wherein said movement member comprises:

a shaft, rotatably mounted on said frame;

an arm, having a first end mounted on said shaft and a second end hinged to said first protrusion; and an actuator configured to rotate said shaft around its longitudinal axis.

2. The device according to claim 1, wherein said first trajectory is defined by at least a portion of a circle.

3. The device according to claim 1, wherein the second trajectory is curved with concavity facing upwards.

4. The device according to claim 1, comprising a plate having a slot defining said second trajectory.

5. The device according to claim 1, wherein said frame comprises a first upright and a second upright, said shaft extending from said first upright to said second upright, said tray extending between said first upright and said second upright.

6. The device according to claim 5, wherein said actuator is at least partly housed in one of said first and second uprights.

7. The device according to claim 1, wherein said first trajectory is defined by a trajectory followed by the second end of said arm when said shaft is rotated.

8. The device according to claim 1, wherein said first protrusion is arranged in a central portion of said first side.

9. The device according to claim 1, wherein said second protrusion is arranged between said first protrusion and the front end of said tray.

10. The device according to claim 1, wherein the second protrusion comprises a plug and a wheel rotatably mounted on said plug, said wheel being configured to engage said guide so as to move along said second trajectory.

* * * * *